United States Patent [19]
Jean

[11] Patent Number: 4,843,905
[45] Date of Patent: Jul. 4, 1989

[54] HANDLE BAR SOCKET WITH AIR BLOWING AND SOUNDING FUNCTION

[76] Inventor: San B. Jean, 81-1, Hsin Hsing Road, Toucheng Jenn, I-Lan Shiann, Taiwan

[21] Appl. No.: 198,930

[22] Filed: May 24, 1988

[51] Int. Cl.$^4$ .................. B62K 21/26; B62K 21/12
[52] U.S. Cl. .................. 74/551.9; 74/551.8; 280/288.4; 280/288.2; 446/193
[58] Field of Search ............... 74/551.8, 551.9, 551.1, 74/551.2; 280/270, 289 H, 263, 281 LP, 261, 289 R, 289 S; 446/184, 193, 192

[56] References Cited

U.S. PATENT DOCUMENTS

| 583,497 | 6/1897 | Merry | 74/551.9 |
| 587,388 | 8/1897 | Conard | 74/551.9 |
| 599,131 | 2/1898 | King | 74/551.9 |
| 1,827,943 | 10/1931 | Johnson | 74/551.8 |
| 2,094,217 | 9/1937 | Meredith | 74/551.9 |
| 2,218,408 | 10/1940 | Meyerhoefer | 280/289 H |
| 2,557,263 | 6/1951 | Davis | 280/289 R |
| 2,667,720 | 2/1954 | Connell | 280/289 H |
| 3,251,241 | 5/1966 | Francis | 74/551.9 |
| 4,151,677 | 5/1979 | Tucker | 280/289 R X |
| 4,735,592 | 4/1988 | Griffin | 280/289 R X |

FOREIGN PATENT DOCUMENTS 899089  5/1945  France ............... 74/551.9

Primary Examiner—Vinh Luong
Attorney, Agent, or Firm—Wenderoth, Lind & Ponack

[57] ABSTRACT

An air blowing and sounding handle bar socket connects onto the end of handle bars of bicycles and the like. A whistle inserted in the handle bar socket makes a pleasant sound when the handle bar socket is squeezed. Two semicircular air chambers are connected with a third chamber, and all of the three chambers supply compressed air for sounding the whistle when the handle bar socket is squeezed.

1 Claim, 1 Drawing Sheet

HANDLE BAR SOCKET WITH AIR BLOWING AND SOUNDING FUNCTION

FIELD OF THE INVENTION

This invention relates to a handle bar socket of a bicycle or of other vehicles having handle bars. The handle bar socket has an air blowing and sounding function when pressed or squeezed.

BACKGROUND OF THE INVENTION

In general, vehicles having handle bars, such as, bicycles, exercise bicycles, or children's bicycles, and the like, usually are provided with handle bar sockets at the end of the handle bars (the grasping portion). There are soft and hard handle bar sockets chiefly made of rubber material. Also, there are generally ribbings on the surface of the handle bar socket or such are designed with coarse surfaces. The main function of such surfaces is to prevent slipping, while the handle bar sockets also function as decoration. The conventional handle bar socket has no other function in addition to the above.

SUMMARY OF THE INVENTION

In view of the above factors, this invention provides a handle bar socket with the function of air blowing and sounding. The chief structural feature is that there are two semicircular air chambers to be integrally connected on the end of the body of the handle bar socket, and a separating wall or portion of each of the two semicircular air chambers extends into a small air chamber inside the body of the handle bar socket. The separating portions of each of the two semicircular air chambers are joined at one end, and a whistle device is inserted into an opening in the end. The two semicircular air chambers extend into the interior of the body of the handle bar socket and further define a small air chamber. There are connecting slots around the small air chamber and the inner wall of the body of the handle bar socket to be used for connecting the handle bar socket to the handle bar. When the two semicircular air chambers are pressed, air is compressed and forced out of the chambers and through a whistle. The forced air passing through the whistle gives a pleasant sound. When the air chamber is then restored back to its original shape, it sucks a certain amount of air back through the whistle device to be used in the next pressing of the air chambers.

DETAILED DESCRIPTION OF THE PREFERRED EMBODIMENT

Figure 1:
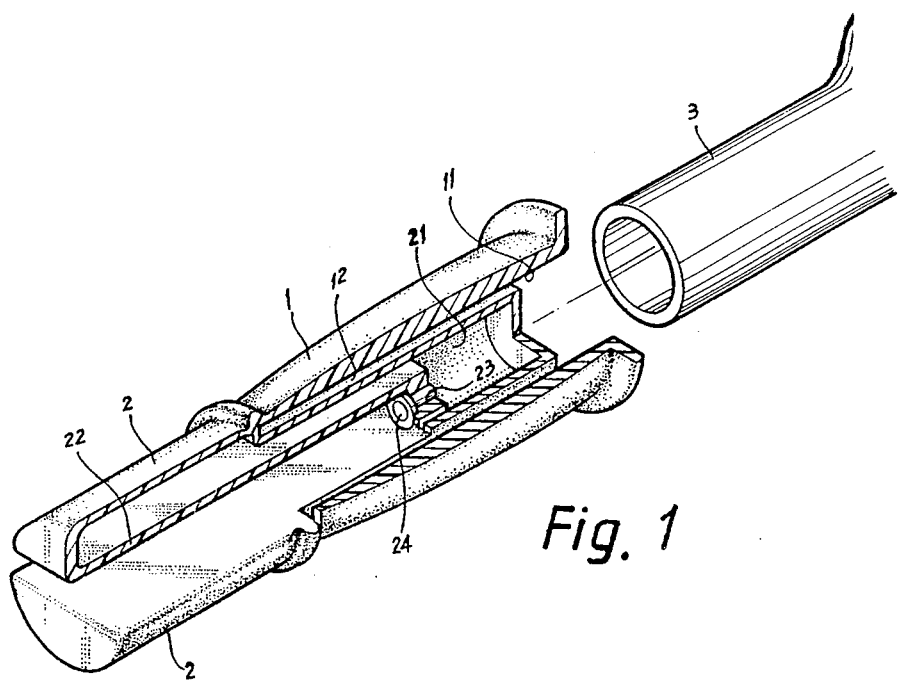
FIG. 1 is a partially exploded and partially sectional view of the structure of this invention.
Figure 3:
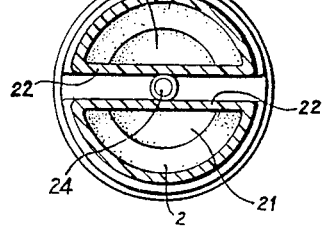
FIG. 3 is a sectional view taken along the line A—A in FIG. 2.
Figure 2:
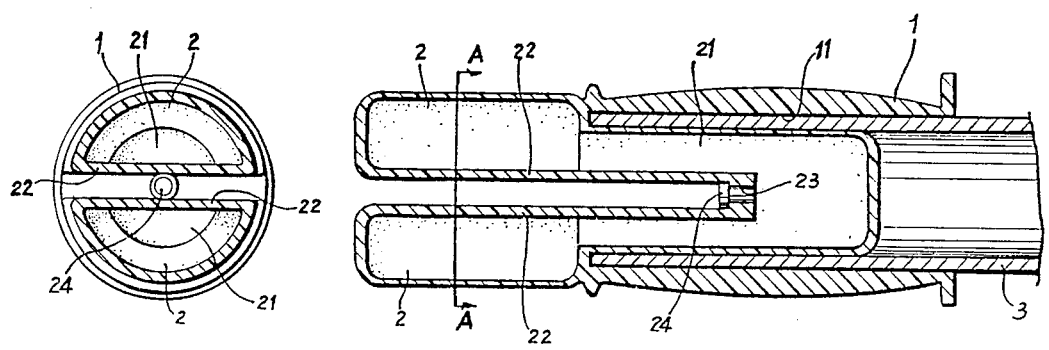
FIG. 2 is a sectional view of the combination of the structure of FIG. 1 of this invention.

As shown in the drawings, the end of body 1 of the handle bar socket of this invention extends an appropriate length for mating with a handle bar 3. The body 1 is integral and forms two semicircular air chambers 2. The two semicircular or semicylindrical air chambers 2 extend into the interior of handle bar socket body 1 for an appropriate depth and partially define an unobstructed small air chamber 21. The small air chamber 21 and the inner wall 11 of the handle bar socket body 1 define a mortising or connecting slot 12 to allow handle bar 3 mating with it to mortise or connect and combine handle bar body 1 and handle bar 3.

A respective side of each of the above two semicircular air chambers 2 is designated a separating portion or wall 22, and each separating portion 22 extends a certain depth into the small air chamber 21. There is a second joining or mortising hole 23 on the surface of the extending joined end of the two separating portions 22 receiving a whistle 24 therein. In addition, the thickness of separating portion 22 may be increased in order to get better supporting strength.

The operation of the structure as described above is as follows. When a force is applied to press the two semicircular air chambers 2, on account of the two semicircular air chambers 2 and the small air chamber 21 being unobstructedly connected, and on account of the whole body 1 being substantially closed except for joining hole 23, compressed air enters into the small air chamber 21 from air chambers 2. Then, the air is expelled outwardly through the air hole of whistle 24 which occupies joining holes 23. As the air passes through whistle 24, the reeds of whistle 24 are vibrated to give a pleasant sound; likewise, when the pressing force on the two semicircular air chambers 2 disappears, the two semicircular air chambers 2 bounce back to their original shape by means of their own flexibility and resiliency. Meanwhile, in this process of the semicircular air chambers 2 regaining their original shapes, air is sucked into small air chamber 21 through the air hole of whistle 24 and fills both small air chamber 21 and the two semicircular air chambers 2 with air to be used for the next pressing of air chambers 2.

I claim:

1. In combination, a handle bar socket and a handle bar for a bicycle, said combination comprising:
    a handle bar for a bicycle, said handle bar having first and second substantially cylindrical ends; and
    a handle bar socket attached to one of said first and second ends of said handle bar, said handle bar socket including two resilient semicircular air chambers, a third small air chamber fluidly communicating said two resilient semicircular air chambers, each said two semicircular air chambers having a separating wall extending partially into said third small chamber, said separating walls being attached together at an end thereof in said third small chamber, said end having a whistle-receiving hole therein for receiving an air whistle, an air whistle received in said whistle-receiving hole, compressed air being forced from each said two resilient semicircular air chambers into said third small air chamber and through said air whistle for producing a sound when a force is applied to each said two resilient semicircular air chambers for partially collapsing said two air chambers, and said two chambers returning to a normal uncollapsed state and drawing air in through said air whistle and into said third small chamber and into said two resilient air chambers when a force is no longer applied to said two resilient semicircular air chambers.

* * * * *